Patented Jan. 30, 1940

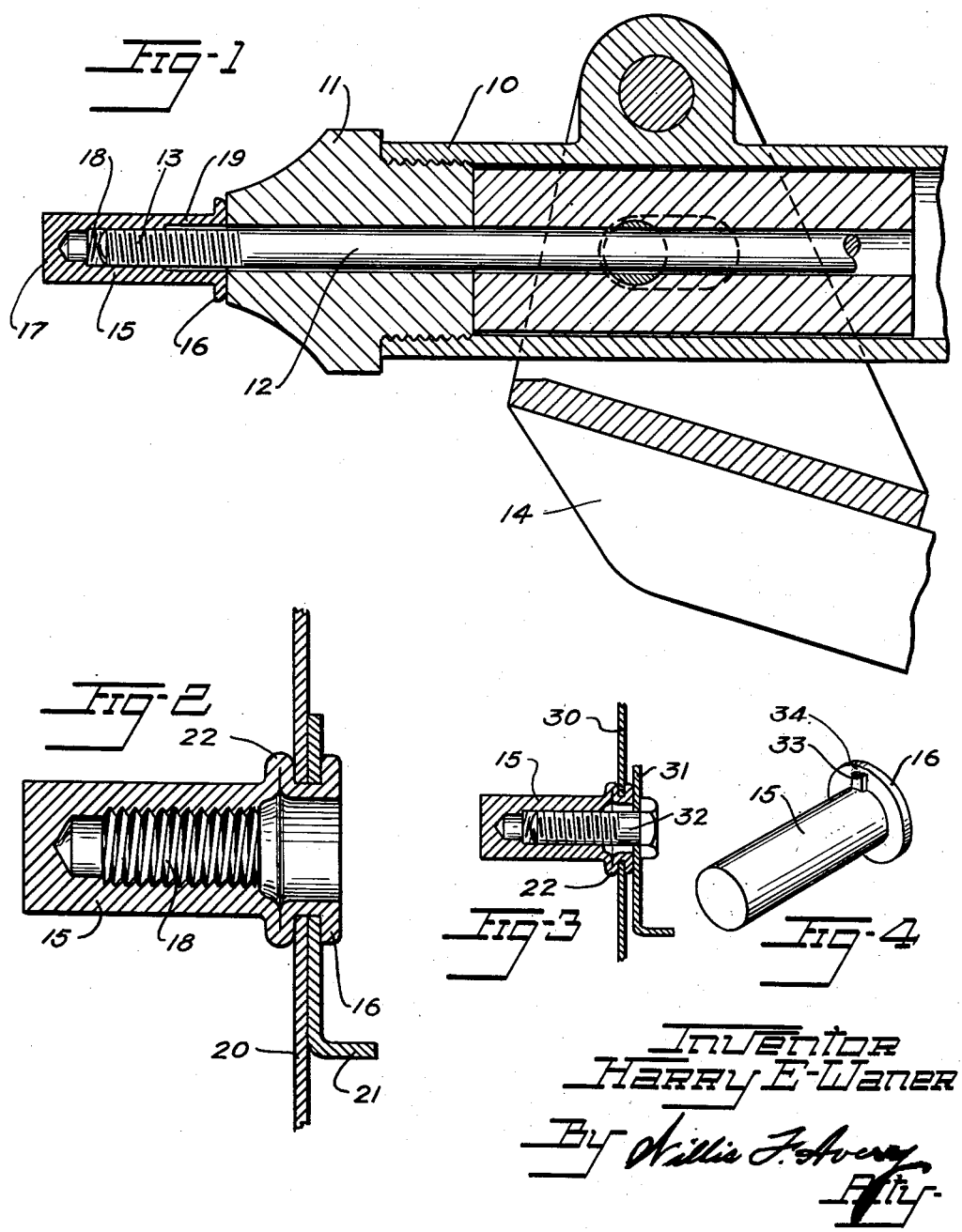

2,188,422

UNITED STATES PATENT OFFICE 2,188,422

FLUID-TIGHT ATTACHMENT AND TUBULAR RIVET THEREFOR

Harry E. Waner, Akron, Ohio, assignor to The B. F. Goodrich Company, New York, N. Y., a corporation of New York Application June 9, 1937, Serial No. 147,218

6 Claims. (Cl. 85—40)

This invention relates to wall attachments and especially to tubular rivets for providing such attachments. The invention is especially adapted to provide fluid-tight attachments on the walls of structure such as aircraft and it provides an attachment in which a device can be detachably mounted by a screw-member leaving the wall water-tight and even air-tight whether the device and screw member be mounted or removed.

The chief objects of the invention are to provide fluid-tightness of the attachment, to provide strength of the attachment, and to provide for convenience of assembly even though the assembly can be effected from only one side of the wall. Another object is to provide an improved tubular rivet and especially a rivet that will make possible the objects above set forth.

These and further objects will be apparent from the following description, reference being had to the accompanying drawing in which:

Fig. 1 is a longitudinal section of a tubular rivet constructed in accordance with and embodying the invention in its preferred form, the rivet being shown as applied to an attaching tool, the latter being in longitudinal section with parts broken away.

Fig. 2 is a vertical section of the rivet of Fig. 1 after application to a wall, the applying tool having been removed.

Fig. 3 is a vertical section of the rivet as applied to a wall for the detachable mounting of an accessory device thereto.

Fig. 4 is a perspective view of the uncollapsed rivet in its preferred form.

Referring to Fig. 1, any suitable attaching tool may be used, it being preferred, however, to use a tool such as is described and claimed in my Patent No. 2,069,907 for Apparatus for installing tubular rivets, dated February 9, 1937. Such a tool comprises in general a casing 10 having an anvil 11 mounted at its front end and a rod 12 reciprocable in the casing 10 through an aperture in the anvil and having a threaded projecting end 13. Means comprising a handle 14 are provided for retracting the rod 12 to collapse the rivet against the anvil 11, and, as is disclosed more fully in said patent, means are provided also for rotating the rod 12 to screw a tubular rivet upon it and to unscrew the rod from the rivet. The tool itself, for which reference may be had to said patent, does not form a part of the present invention except insofar as it is useful in applying the improved rivet of this invention.

The improved rivet of this invention, which is adapted to be seated in a wall aperture and to be collapsed in a portion of its body to provide a completely fluid-tight attachment to the wall, comprises a tubular rivet 15 having a flange 16 at one end thereof and a completely closed end portion 17 at the other end. The rivet is preferably of a light, strong ductile material, such as aluminum, although it may be of copper, steel or a suitable alloy. In the interior of the tubular body portion is provided a screw threaded portion 18 between which and the flange 16 is provided a collapsible wall portion 19 preferably of reduced wall thickness and preferably also of cylindrical form on its outer surface so that, while it may be inserted in an aperture of corresponding diameter it may be outwardly collapsed with a maximum of bulge for a strong grip against the wall.

In Fig. 2 is shown a wall 20 and an element 21 of a bracket or other structure for permanent attachment to the wall. An aperture is formed through the element 21 and wall 20 corresponding in diameter to the cylindrical body of the rivet. The rivet is then screwed upon the end of the rod 12 of the tool with the flanged end of the rivet abutting the anvil 11, and the rivet is inserted through the apertures in element 21 and wall 20. Upon retraction of the rod 12 the portion 19 of the rivet is outwardly collapsed at 22 to grip the wall 20 and element 21 between the collapsed portion and the flange 16. The reaction pressure is supplied by the anvil 11 against which the flanged end of the rivet bears.

Upon removing the tool by unscrewing the rod 12 from the rivet the rivet is mounted permanently in place and it has been found that the attachment is secure and effectively fluid-tight at the wall. Also, inasmuch as the rivet is entirely closed at its opposite end and is continuously annular the whole attachment is entirely water-tight even though the rivet remains open, as in Fig. 2. Although it has not been found necessary in most cases, if desired a plastic sealing material may be applied before the rivet is collapsed to give maximum assurance against leakage between the wall and the portion of the rivet gripping it. For increasing the strength of the attachment a screw may be threaded into the rivet, although this is not necessary for fluid-tightness.

In the embodiment of Fig. 3 a detachable mounting is provided and the attachment is likewise fluid-tight whether the attaching screw and auxiliary device be applied to the rivet or not. The rivet is of the same construction as the embodiment of Figs. 1 and 2 and it is mounted in a wall member 30 in the same manner. An accessory device, an element of which is shown at 31, is detachably held against the bottom face of the flange of the rivet by means of a screw or bolt 32. The element 31 and screw 32 are mounted in the rivet after the latter has been affixed to the wall 30 and a strong detachable mounting is provided which is completely fluid-tight whether the screw 32 and element 31 be mounted or detached and the rivet left open.

For the purpose of lessening the likelihood of loosening the rivet in the wall as a result of torsional stresses from repeated insertions and removals of the screw member from the rivet a key element 33 (Fig. 4) may be provided, the wall being correspondingly notched prior to the insertion of the rivet to receive the key and resist turning of the rivet. Preferably the key element 33 is formed of less radial extent than the flange 16 so as to provide a flange portion 34 outwardly of the key in the radial direction to assure water-tightness despite the key slot formed in the wall, the key slot of course being formed of less radial extent than the flange 16.

It will be apparent that the objects are satisfied of a rivet adapted for application from one side only of the work, and providing for a detachable mounting that is secure and fluid-tight at all times.

Variations may be made without departing from the scope of the invention as it is defined in the following claims:

I claim:

1. A tubular rivet adapted to be seated in a wall aperture and to be outwardly collapsed in a portion thereof to hold the rivet against the wall, said rivet comprising a flange at one end, a continuously annular cylindrical body of substantially uniform outside diameter throughout terminating in a completely closed end portion opposite the flanged end, an intermediate, outwardly collapsible portion of reduced wall thickness adapted to be collapsed to grip the wall between it and said flange in water sealing relation, and an interiorly threaded portion between the collapsible portion and the closed end adapted to be engaged by a threaded member inserted in the rivet from its flanged end.

2. A tubular rivet adapted to be seated in a wall aperture and to be outwardly collapsed in a portion thereof to hold the rivet against the wall, said rivet comprising a tubular, completely closed body having a wall-engaging flange at one end and an intermediate, outwardly collapsible portion adapted to be collapsed to grip the wall between it and the flange in water-tight relation thereto, and a key element associated with said flange, said key element being of less radial extent than said flange so that the flange has a sealing portion radially outward of the key element.

3. A water-tight attachment assembly for a wall provided with an aperture, said assembly comprising an element for mounting detachably on the wall, a tubular rivet adapted to be seated in the aperture of the wall and having a flange for disposition at the front face of the wall, a completely closed portion at the other end of the rivet, an intermediate, outwardly collapsed portion for disposition at the rear face of said wall, an internally screw threaded portion, a screw member for engaging the threaded portion of the rivet and detachably holding said element against the front face of the flange of the rivet, the flange having a key thereon of less radial extent than the flange to seat in a slot in the wall to permit the flange to seal radially outward of the key and slot.

4. A tubular rivet adapted to be inserted in a wall aperture and to be expanded outwardly in a portion thereof to hold the rivet against the wall, said rivet comprising a continuously annular cylindrical body of substantially uniform outside diameter throughout its length and a flange at one end thereof, said body having a bore of substantially uniform diameter extending into the body from the flanged end and terminating in a threaded portion adapted to be engaged by a threaded member inserted in the bore from the flanged end of the rivet, the threaded end of the bore being closed by an imperforate wall, the body between said threaded portion and the flanged end being adapted to be outwardly expanded by forces applied axially of the rivet by engagement of a threaded member with the screw threads to form a second flange at the face of the wall opposite that adjacent the said flanged end of the rivet and parallel thereto to seal the aperture in said wall.

5. A tubular rivet adapted to be inserted in a wall aperture and to be expanded outwardly in a portion thereof to hold the rivet against the wall, said rivet comprising a continuously annular cylindrical body of substantially uniform outside diameter throughout its length and a wall-engaging flange at one end thereof formed with a key-element of less radial extent than the flange to seat in a recess in the wall to prevent turning of the rivet and to permit the flange to seal radially outward of the key-element and recess, said body having a bore of substantially uniform diameter extending into the body from the flanged end and terminating in a threaded portion adapted to be engaged by a threaded member inserted in the bore from the flanged end of the rivet, the threaded end of the bore being closed by an imperforate end wall, the body between said threaded portion and the flanged end being adapted to be outwardly expanded by forces applied axially of the rivet by engagement of a threaded member with the screw threads to form a second flange at the face of the wall opposite that adjacent the said flanged end of the rivet and parallel thereto to seal the aperture in said wall.

6. A tubular rivet adapted to be seated in a wall aperture and to be outwardly collapsed in a portion thereof to hold the rivet against the wall, said rivet comprising a continuously annular body having a wall-engaging flange at one end, a completely closed portion at the other end, and an outwardly-collapsible thin-walled cylindrical portion of uniform diameter adjacent the flange terminating in an internally threaded portion of greater wall thickness between the collapsible portion and the closed end, said threaded portion being adapted to be engaged by a removable threaded member inserted from the flanged end.

HARRY E. WANER.